US009182500B2

(12) United States Patent
Wang et al.

(10) Patent No.: US 9,182,500 B2
(45) Date of Patent: Nov. 10, 2015

(54) METHOD AND SYSTEM FOR AMPLITUDE DIGITIZATION OF NUCLEAR RADIATION PULSES

(75) Inventors: Yonggang Wang, Hefei (CN); Wensong Zhu, Hefei (CN); Jun Chen, Hefei (CN)

(73) Assignee: UNIVERSITY OF SCIENCE AND TECHNOLOGY OF CHINA, Anhui (CN)

( * ) Notice: Subject to any disclaimer, the term of this patent is extended or adjusted under 35 U.S.C. 154(b) by 412 days.

(21) Appl. No.: 13/807,765

(22) PCT Filed: May 22, 2012

(86) PCT No.: PCT/CN2012/075885
§ 371 (c)(1),
(2), (4) Date: Mar. 14, 2013

(87) PCT Pub. No.: WO2012/163239
PCT Pub. Date: Dec. 6, 2012

(65) Prior Publication Data
US 2013/0161528 A1     Jun. 27, 2013

(30) Foreign Application Priority Data

Jun. 2, 2011 (CN) .......................... 2011 1 0147423

(51) Int. Cl.
*G01T 1/17* (2006.01)

(52) U.S. Cl.
CPC ........................................ *G01T 1/17* (2013.01)

(58) Field of Classification Search
CPC ......... G01T 1/1647; G01T 1/17; G01T 1/172; G01T 1/18; G01T 1/20; G01R 23/09; G01R 29/0857
USPC .......... 250/362, 363.03, 369, 390.07, 390.08, 250/391, 394, 395
See application file for complete search history.

(56) References Cited

U.S. PATENT DOCUMENTS 4,217,497 A * 8/1980 Daniels et al. ................. 250/369
5,367,168 A * 11/1994 Berthold et al. .............. 250/362

(Continued)

*Primary Examiner* — David Porta
*Assistant Examiner* — Djura Malevic
(74) *Attorney, Agent, or Firm* — Morris & Kamlay LLP

(57) ABSTRACT

Disclosed are methods and systems for amplitude digitization of nuclear radiation pulses. The method includes: applying a constant fraction discrimination (CFD) timing process on a subject current signal and outputting a CFD timing signal; applying a shaping process on the subject current signal to obtain a subject shaped signal; comparing, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as $\Delta T$; converting a time length between the time Td and the time Tot into a digital quantity as a digitized value of the amplitude of the nuclear radiation pulse; wherein for any two subject shaped signals having amplitudes Vot1 and Vot2, respectively, the dynamic threshold signal satisfies an equation $$\frac{Tot2 - To}{Vot2} = \frac{Tot1 - To}{Vot1},$$

Tot1 represents an over-threshold time for one of the subject shaped signals compared with the dynamic threshold signal, and Tot2 represents an over-threshold time for the other of the subject shaped signals compared with the dynamic threshold signal.

39 Claims, 12 Drawing Sheets

(56) References Cited

U.S. PATENT DOCUMENTS

| | | | |
|---|---|---|---|
| 6,160,259 A * | 12/2000 | Petrillo et al. | 250/363.07 |
| 6,232,604 B1 * | 5/2001 | McDaniel et al. | 250/363.03 |
| 6,252,232 B1 * | 6/2001 | McDaniel et al. | 250/369 |
| 6,392,236 B1 * | 5/2002 | Maekawa et al. | 250/369 |
| 6,664,543 B2 * | 12/2003 | Moyers et al. | 250/369 |
| 6,822,506 B2 * | 11/2004 | Binkley | 327/551 |
| 7,126,126 B2 * | 10/2006 | Schyler et al. | 250/363.03 |
| 7,199,370 B2 * | 4/2007 | Xie et al. | 250/363.03 |
| 7,411,199 B2 * | 8/2008 | Vernon | 250/370.08 |
| 7,459,688 B2 * | 12/2008 | Aoki | 250/363.03 |
| 7,683,334 B2 * | 3/2010 | Farsoni et al. | 250/367 |
| 7,818,047 B2 * | 10/2010 | Tumer et al. | 600/436 |
| 8,003,948 B2 * | 8/2011 | Haselman et al. | 250/362 |
| 8,309,932 B2 * | 11/2012 | Haselman et al. | 250/362 |
| 8,340,377 B2 * | 12/2012 | McFarland et al. | 382/128 |
| 2003/0020517 A1 * | 1/2003 | Souchkov | 327/65 |
| 2004/0188623 A1 * | 9/2004 | Breeding et al. | 250/363.03 |
| 2005/0247879 A1 * | 11/2005 | Xie et al. | 250/363.03 |
| 2009/0039271 A1 * | 2/2009 | Farsoni et al. | 250/367 |
| 2009/0074281 A1 * | 3/2009 | McFarland et al. | 382/131 |
| 2009/0224158 A1 * | 9/2009 | Haselman et al. | 250/363.02 |
| 2010/0025589 A1 * | 2/2010 | Olcott et al. | 250/363.03 |
| 2010/0078569 A1 * | 4/2010 | Jarron et al. | 250/363.04 |
| 2011/0095173 A1 * | 4/2011 | Menge et al. | 250/262 |
| 2011/0301918 A1 * | 12/2011 | Haselman et al. | 702/187 |
| 2013/0168534 A1 * | 7/2013 | Burr et al. | 250/208.2 |

* cited by examiner

METHOD AND SYSTEM FOR AMPLITUDE DIGITIZATION OF NUCLEAR RADIATION PULSES

TECHNICAL FIELD

The present invention relates to processing of nuclear radiation pulse signals, and in particular to methods and systems for amplitude digitization of nuclear radiation pulses.

BACKGROUND

A nuclear event energy detector is an instrument that converts amplitudes of nuclear radiation pulses into measurable electrical signals and measures the electrical signals. The electrical signals are a series of discrete pulse signals, and the amplitude values of these pulse signals represent energy of the radiations. A conventional method for measuring the amplitude of a nuclear radiation pulse signal includes converting the input analog signal into digital format using an analog-to-digital converter (ADC). This method is inapplicable to a nuclear detector system with a large number of channels and requiring parallel readout of multiple channels, such as a nuclear imaging detector system. This is because each of the channels needs a high-speed ADC, leading to an unacceptable scale of an electronic system for signal readout and digitization. There is therefore a need for a new method for amplitude digitization of a nuclear radiation pulse to accommodate the parallel readout and digitization requirements for a system with a large number of channels while achieving a high integration level.

SUMMARY

According to the present invention, the voltage amplitude value of a nuclear radiation pulse signal can be linearly converted into an over-threshold time width to enable digitization of energy signals by time digital conversion technology, without significantly increasing the front-end readout circuit of the nuclear event energy detector. Since time measurement technology is relatively simple and well-developed, the present invention can achieve a high precision measurement for a nuclear radiation signal digitization system with a large number of channels. More importantly, no addition of any extra front-end readout circuit is required, and thus it is possible to achieve a highly integrated multi-channel digitization system. The present invention makes it possible to design a multi-channel nuclear signal digitization system on a single-chip FPGA or ASIC.

An aspect of the present invention provides a method for amplitude digitization of a nuclear pulse, comprising steps of:

applying, by a constant fraction discrimination (CFD) timing circuit, a CFD timing process on a subject pulse signal output from a nuclear event energy detector, and outputting a CFD timing signal for indicating an arrival time Td of a present nuclear event;

applying, by a shaping circuit, a shaping process on the subject pulse signal to obtain a subject shaped signal;

comparing, from a time To, values taken at the same time by the subject shaped signal and a dynamic threshold signal, and taking, as an over-threshold time Tot for the present nuclear event, a time when the value of the dynamic threshold signal changes from less than the value of the subject shaped signal to not less than the value of the subject shaped signal, wherein a time length between Td and To is preset as ΔT;

converting a time length between Td and Tot into a digital quantity;

wherein the dynamic threshold signal satisfies an equation $$\frac{Tot2 - To}{Vot2} = \frac{Tot1 - To}{Vot1},$$

Tot1 represents an over-threshold time for a first shaped signal compared with the dynamic threshold signal, Vot1 represents an amplitude of the first shaped signal, Tot2 represents an over-threshold time for a second shaped signal compared with the dynamic threshold signal, Vot2 represents an amplitude of the second shaped signal.

A further aspect of the present invention provides a system for amplitude digitization of a nuclear pulse, wherein the system comprises a nuclear energy detector, a shaping circuit, a constant fraction discrimination (CFD) timing unit, a comparator circuit and a time digital conversion (TDC) unit; the nuclear event energy detector has an output terminal connected to input terminals of the shaping circuit and the CFD timing unit, the CFD timing unit comprises a CFD timing circuit, and the TDC unit comprises a TDC circuit;

wherein:

the shaping circuit is configured to apply a shaping process on a subject pulse signal output from the nuclear event energy detector and output a subject shaped signal;

the CFD timing circuit is configured to apply a CFD process on the subject pulse signal output from the nuclear event energy detector, and output a CFD timing signal for indicating an arrival time Td of a present nuclear event;

the comparator circuit is configured to compare, from a time To, values taken at the same time by the subject shaped signal and a dynamic threshold signal, and when the value of the dynamic threshold signal changes from less than the value of the subject shaped signal to not less than the value of the subject shaped signal, to output a pulse signal for indicating an over-threshold time Tot for the present nuclear event, wherein a time length between. Td and To is preset;

the TDC circuit is configured to record the Td and Tot, and convert a time length between Td and Tot into a digital quantity;

wherein the dynamic threshold signal satisfies an equation $$\frac{Tot2 - To}{Vot2} = \frac{Tot1 - To}{Vot1},$$

Tot1 represents an over-threshold time for a first shaped signal compared with the dynamic threshold signal, Vot1 represents an amplitude of the first shaped signal, Tot2 represents an over-threshold time for a second shaped signal compared with the dynamic threshold signal, Vot2 represents an amplitude of the second shaped signal.

A still further aspect of the present invention provides a method for amplitude digitization of a nuclear radiation pulse by converting the amplitude of the nuclear radiation pulse linearly into a time length and measuring the time length, said method comprises steps of:

generating, based on a subject current signal output from a nuclear event energy detector, a constant fraction discrimination (CFD) timing signal for indicating an arrival time Td of the subject current signal;

applying a shaping process on the subject current signal to obtain a subject shaped signal;

comparing, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as ΔT;

converting a time length between the time Td and the time Tot into a digital quantity as a digitized value of the amplitude of the nuclear radiation pulse;

wherein for any two subject shaped signals having amplitudes Vot1 and Vot2, respectively, the dynamic threshold signal satisfies an equation $$\frac{Tot2 - To}{Vot2} = \frac{Tot1 - To}{Vot1},$$

Tot1 represents an over-threshold time for one of the subject shaped signals compared with the dynamic threshold signal, and Tot2 represents an over-threshold time for the other of the subject shaped signals compared with the dynamic threshold signal.

A yet further aspect of the present invention provides a system for amplitude digitization of a nuclear radiation pulse, wherein the system comprises a nuclear event energy detector, a shaping circuit, a constant fraction discrimination (CFD)timing unit, a comparator circuit and a time digital conversion (TDC) unit; the nuclear event energy detector has an output terminal connected to input terminals of the shaping circuit and the CFD timing unit, the CFD timing unit comprises a CFD circuit, and the TDC unit comprises a TDC circuit;

wherein:

the shaping circuit is configured to apply a shaping process on a subject current signal output from the nuclear event energy detector, and output a subject shaped signal;

the CFD timing circuit is configured to applying a CFD process on the subject current signal output from a nuclear event energy detector, and output a CFD timing signal for indicating an arrival time Td of the subject current signal;

the comparator circuit is configured to compare, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as ΔT;

the TDC circuit is configured to record the times Td and Tot, and convert a time length between the time Td and the time Tot into a digital quantity;

wherein for any two subject shaped signals having amplitudes Vot1 and Vot2, respectively, the dynamic threshold signal satisfies an equation $$\frac{Tot2 - To}{Vot2} = \frac{Tot1 - To}{Vot1},$$

Tot1 represents an over-threshold time for one of the subject shaped signals compared with the dynamic threshold signal, and Tot2 represents an over-threshold time for the other of the subject shaped signals compared with the dynamic threshold signal.

BRIEF DESCRIPTION OF THE DRAWINGS

For a better description of embodiments of the present invention or conventional solutions, accompanying drawings for the description is introduced in the following.

DETAILED DESCRIPTION OF THE PREFERRED EMBODIMENTS

Hereafter, solutions of the present invention will be described in a clear and complete manner with reference to figures and embodiments of the present invention. The described embodiments are just several example implementations of the present invention. A person skilled in the art can envision other embodiments based on the described embodiments without undue efforts, and the other embodiments also fall into the scope of the present invention.

For a better understanding, introduction is first made for a nuclear event energy detector, a shaping circuit, and a CFD timing circuit involved in the present invention.

In an embodiment, the nuclear event energy detector may be primarily configured to detect energy of γ rays, and convert a nuclear radiation pulse signal into a subject pulse signal. The nuclear event energy detector may be generally a combination of a scintillation crystal, such as LYSO (lutetium yttrium orthosilicate) crystal or sodium iodide crystal, and a photoelectric converter, such as a photoelectric multiplier tube (PMT). The subject pulse signal is output from the photoelectric converter. Since the subject pulse signal is usually a current signal, it may be also referred to as the subject current signal in the present disclosure.

In addition to outputting the subject current signal, some nuclear event energy detectors may also output a timing current signal used for timing. The timing current signal may be a dedicated current signal used for timing outputted separately and simultaneously with respect to outputting of the subject current signal. For these nuclear event energy detectors, the timing current signal may be directly used in a CFD process described later to indicate an arrival time of a nuclear event.

Figure 1:
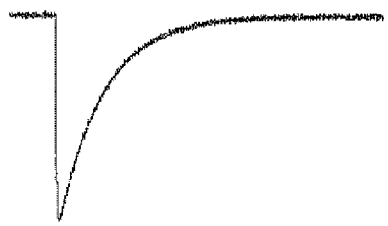
FIG. 1 shows a current waveform of a 511 KeV γ ray provided according to an embodiment of the present invention.

FIG. 1 shows an example of a subject current signal waveform output from the PMT corresponding to a γ ray of 511 KeV. The waveform has a rising time less than Ins for its leading edge, and a falling time for its trailing edge depending on the decay time of LYSO. In an embodiment, the waveform may be set to be 42 ns, and the area of the waveform represents an energy value of a currently detected nuclear event.

The shaping circuit may integrate the subject current signal (i.e., pulse current signal) output from the nuclear event energy detector to obtain a voltage signal (also referred to as a shaped signal whose amplitude is proportional to the energy of the incident γ ray). After the integration process, the voltage signal may further be low-pass filtered or amplified, or shaped by some other conventional shaping circuit.

Figure 2:
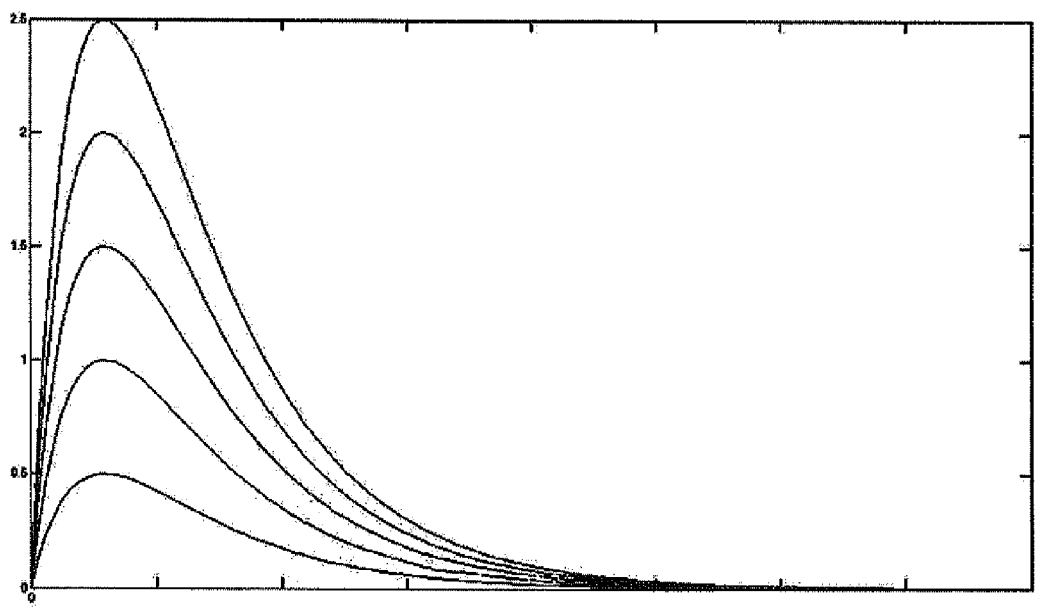
FIG. 2 shows voltage waveforms obtained by integrating current waveforms of nuclear events for different energy levels according to an embodiment of the present invention.

FIG. 2 shows waveforms of voltage signals obtained by integrating current waveforms of different-energy nuclear events according to an embodiment of the present invention. In FIG. 2, the horizontal axis represents time in unit of ns, and the vertical axis represents voltage in unit of volt. As shown in FIG. 2, the waveforms of voltage signals obtained by integrating current signals of nuclear events of different energy levels differ only in the peaks (i.e., amplitude value) of the voltage signal waveforms, while having the same peaking time Tf, rising time and falling time. The rising time of the shaped signal may primarily depend on the decay characteristic of the nuclear event energy detector, and the falling time may depend on the time constant of the shaping circuit. In other words, with a given nuclear event energy detector and a given shaping circuit, the rising time, peaking time and the falling time are fixed.

In the present disclosure, the term "CFD timing" may refer to a timing method in which a point at a height of a signal's rising edge corresponding to a fixed fraction of the signal's amplitude is taken as a timing moment. The term "CFD timing process" may refer to generating and outputting a CFD timing signal, by a CFD timing circuit, at a constant fraction point of a rising edge of an input signal.

For a nuclear event energy detector which does not output a timing current signal, the pulse current signal output from the detector may be transmitted in two paths, one path sending the pulse current signal to the CFD timing circuit to generate a CFD timing signal, and the other path sending the pulse current signal as the subject current signal.

Further, the CFD timing circuit may receive a shaped signal obtained by shaping the subject current signal. Since the CFD timing refers to generating a timing signal at a constant fraction point with respect to the amplitude of the input signal, the timing signal obtained by applying a CFD timing process on a shaped subject current signal will not change with the magnitude of the subject current signal. As can be seen from FIG. 2, for a shaped signal having a different amplitude, a time T1 corresponding to a point, at which the height along the rising edge is in a fixed fraction of the amplitude of the pulse signal, may be taken as a timing moment. The time difference between T1 and the peaking time Tf of the shaped signal is a fixed value ΔT1.

In embodiments of the present invention described below, the CFD timing signal is generated by directly using the subject current signal. However, a person skilled in the art will appreciate that a timing current signal output from the nuclear event energy detector may also be used directly, or the CFD timing signal may be generated by using a shaped signal based on the subject current signal.

Figure 3:
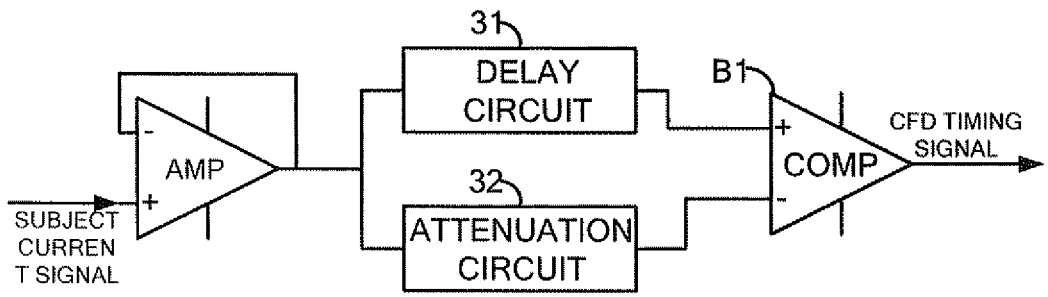
FIG. 3 shows a schematic block diagram of a constant fraction discrimination (CFD) timing circuit according to an embodiment of the present invention.

FIG. 3 shows a schematic block diagram of a CFD timing circuit according to an embodiment of the present invention. The CFD timing circuit may include an amplifier, a delay circuit, an attenuation circuit and a comparator, as shown in FIG. 3. The subject current signal output from the nuclear event energy detector may be passed through the amplifier and then passed to both the delay circuit 31 for delay and the attenuation circuit 32 for attenuation. Then, the delayed signal and the attenuated signal are compared by the comparator circuit B1 to output a CFD timing signal. At this timing moment, the signal value has a fixed fraction of the maximal amplitude value of the waveform of the current signal. The value of the fraction is determined together by the delay amount of the delay circuit 31, the attenuation coefficient of the attenuation circuit 32 and the rising time of the current waveform. The fraction may be adjusted by changing the delay amount in order to adjust when the CFD timing signal occurs.

Figure 4:
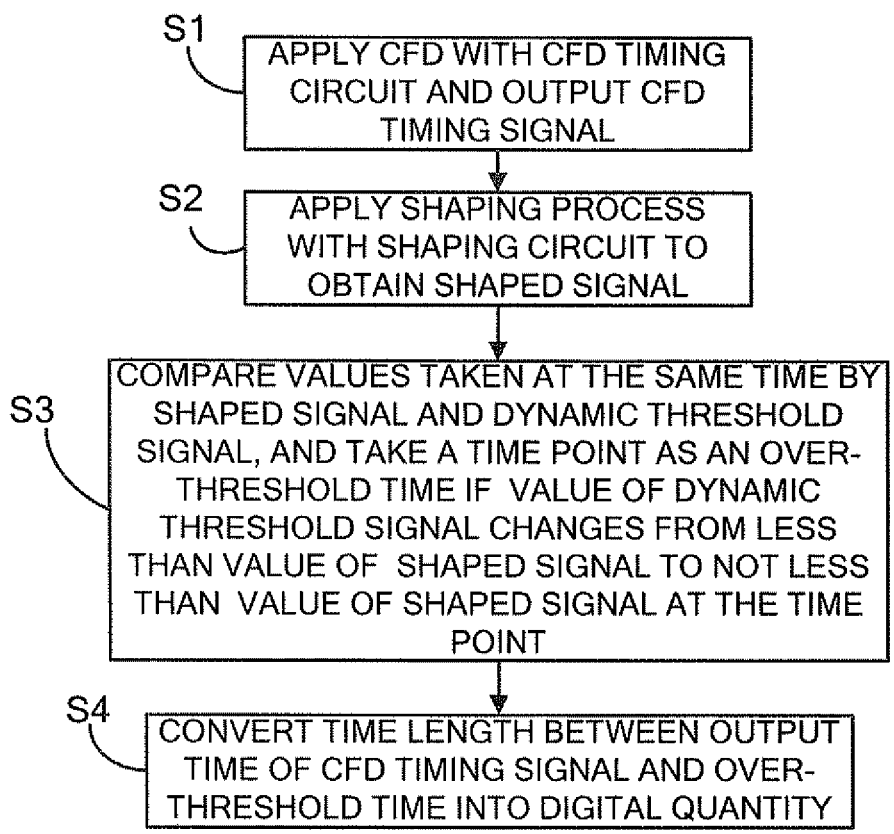
FIG. 4 shows a flowchart of a method for amplitude digitization of a nuclear radiation pulse according to an embodiment of the present invention.

Based on the above, embodiments of the present invention provide methods for digitizing nuclear radiation pulse amplitudes, which enables digitization of amplitudes of the subject pulse signals output from the nuclear event energy detector. The method may include at least the following steps as shown in FIG. 4:

S1: applying, by a CFD timing circuit, a CFD timing process on a subject current signal output from a nuclear event energy detector, and outputting a CFD timing signal for indicating an arrival time Td of the subject current signal;

S2: applying, by a shaping circuit, a shaping process on the subject current signal output from the nuclear event energy detector to obtain a subject shaped signal;

S3: comparing, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as ΔT;

S4: converting a time length between the time Td and the time Tot into a digital quantity.

Two methods may be used to generate the above dynamic threshold signal. One of the methods is to calculate and store in advance the dynamic threshold signal based on the characteristics of the nuclear event energy detector and the parameters of the shaping circuit, and output the dynamic threshold signal from the dynamic threshold generation circuit at the time To when the subject current signal arrives. The other method is to generate the dynamic threshold signal in real time by analog circuit hardware. More detailed will be given in the following section.

According to an embodiment of the present invention, for any two subject shaped signals having amplitudes Vot1 and Vot2, respectively, the dynamic threshold signal satisfies an equation:

$$\frac{Tot2 - To}{Vot2} = \frac{Tot1 - To}{Vot1}, \quad \text{(Equation 1)}$$

where Tot1 represents an over-threshold time for one of the subject shaped signals compared with the dynamic threshold signal (i.e., a time point when the waveforms of the two signals intersect), and Tot2 represents an over-threshold time for the other of the subject shaped signals compared with the dynamic threshold signal (i.e., a time point when the waveforms of the two signals intersect).

Here, the time length between Td and Tot may be referred to as an over-threshold time period.

Figure 5:
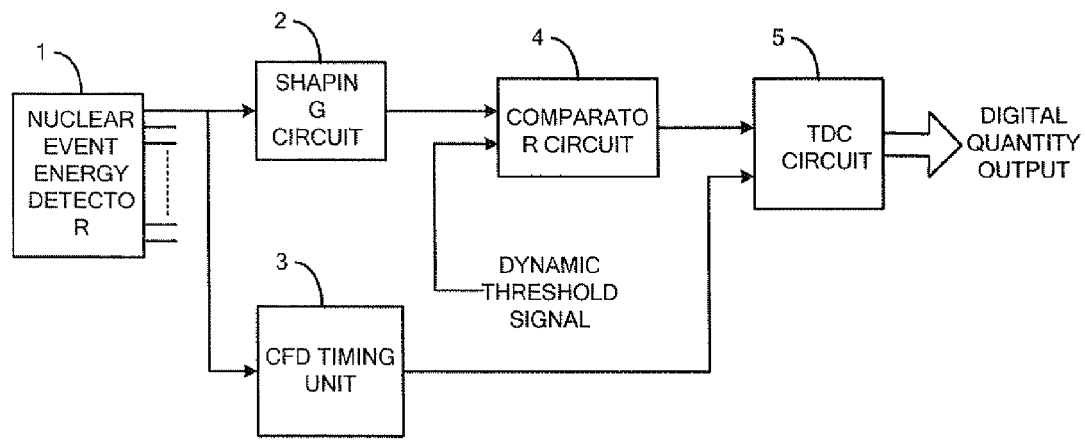
FIG. 5 shows a schematic block diagram of a system for amplitude digitization of a nuclear radiation pulse according to an embodiment of the present invention.

Embodiments of the present invention also provide systems for amplitude digitization of a nuclear radiation pulse, which may carry out the above methods. FIG. 5 shows the structure of an embodiment of the system. The system may include a nuclear event energy detector 1, a shaping circuit 2, a CFD timing unit 3, a comparator circuit 4 and a time digital conversion (TDC) unit 5. The nuclear event energy detector 1 may have an output terminal connected to input terminals of the shaping circuit 2 and the CFD timing unit 3. The CFD timing unit may include the above CFD timing circuit, and the TDC unit 5 may include a TDC circuit.

The shaping circuit 2 may be configured to apply a shaping process on a subject current signal output from the nuclear event energy detector, and output a subject shaped signal.

The CFD timing circuit may be configured to applying a CFD timing process on the subject current signal output from a nuclear event energy detector, and output a CFD timing signal whose arrival time is denoted as Td.

The comparator circuit 4 may be configured to compare, from a time To, values taken at the same time by the subject shaped signal and a dynamic threshold signal, and take a time Tot as an over-threshold time if the value of the dynamic threshold signal changes from less than the value of the subject shaped signal to not less than the value of the subject shaped signal at the time Tot, wherein a time length between the time To and the arrival time Td of the CFD timing signal is preset as ΔT, and the time Tot is an over-threshold time.

The TDC circuit may be configured to record the times Td and Tot, and convert a time length between the time Td and the time Tot into a digital quantity;

Here, the dynamic threshold signal satisfies the equation $$\frac{Tot2 - To}{Vot2} = \frac{Tot1 - To}{Vot1}.$$

For a subject current signal representing a detected nuclear event, suppose the subject shaped signal has an amplitude Vot. Accordingly, $$\frac{Tot - To}{Vot} = \frac{Tot2 - To}{Vot2} = \frac{Tot1 - To}{Vot1}.$$

Further, since the time length between the times To and Td is preset as ΔT (i.e., To=Td−ΔT or $$To = Td + \Delta T),$$

$$\frac{Tot - To}{Vot} = \frac{Tot2 - To}{Vot2} = \frac{Tot1 - To}{Vot1}$$

may be changed into $$\frac{Tot - Td - \Delta T}{Vot} = \frac{Tot2 - To}{Vot2} = \frac{Tot1 - To}{Vot1},$$

or $$\frac{Tot - Td + \Delta T}{Vot} = \frac{Tot2 - To}{Vot2} = \frac{Tot1 - To}{Vot1}.$$

Therefore, according to embodiments of the present invention, in a single nuclear event detection, the amplitude Vot of the subject shaped signal is linearly proportional to Tot−Td+ΔT or Tot−Td−ΔT. Since Td and Tot are measurable, and ΔT is a preset or known value, the time length between Td and Tot can be digitized, achieving digitization of signal amplitude.

Figure 6:
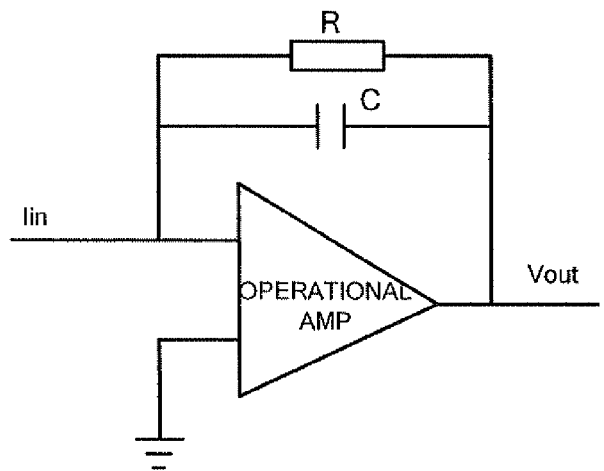
FIG. 6 shows a schematic block diagram of an active RC integration circuit according to an embodiment of the present invention.

In another embodiment of the present invention, the above shaping circuit may be implemented as an active integration circuit, such as an active RC integration circuit. FIG. 6 shows a structure of the active RC integration circuit including a resistor R and a capacitor C connected in parallel. Both ends of the resistor R and the capacitor C are connected to an input terminal Vin and an output terminal Vout of an operational amplifier, and the other input terminal of the operational amplifier is grounded.

Figure 7:
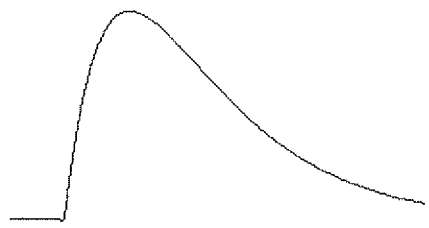
FIG. 7 is a waveform diagram of an output signal from the active RC integration circuit according to an embodiment of the present invention.

The active RC integration circuit may integrate the current signal output from the nuclear event energy detector 1, and output a voltage signal having a waveform as shown in FIG. 7.

In an embodiment of the present invention, in the above active RC integration circuit, the resistor has a resistance R=5KΩ, and the capacitor has a capacitance C=18 pf. The peaking time of the output voltage waveform is 60 ns, and the time for returning to the base line after the peak is greater than 300 ns. For nuclear events with different energy levels, their integrated voltage waveforms differ only in waveform peak value, i.e., amplitudes of voltage waveform, while remaining the same in terms of peaking time and falling time.

Figure 8:
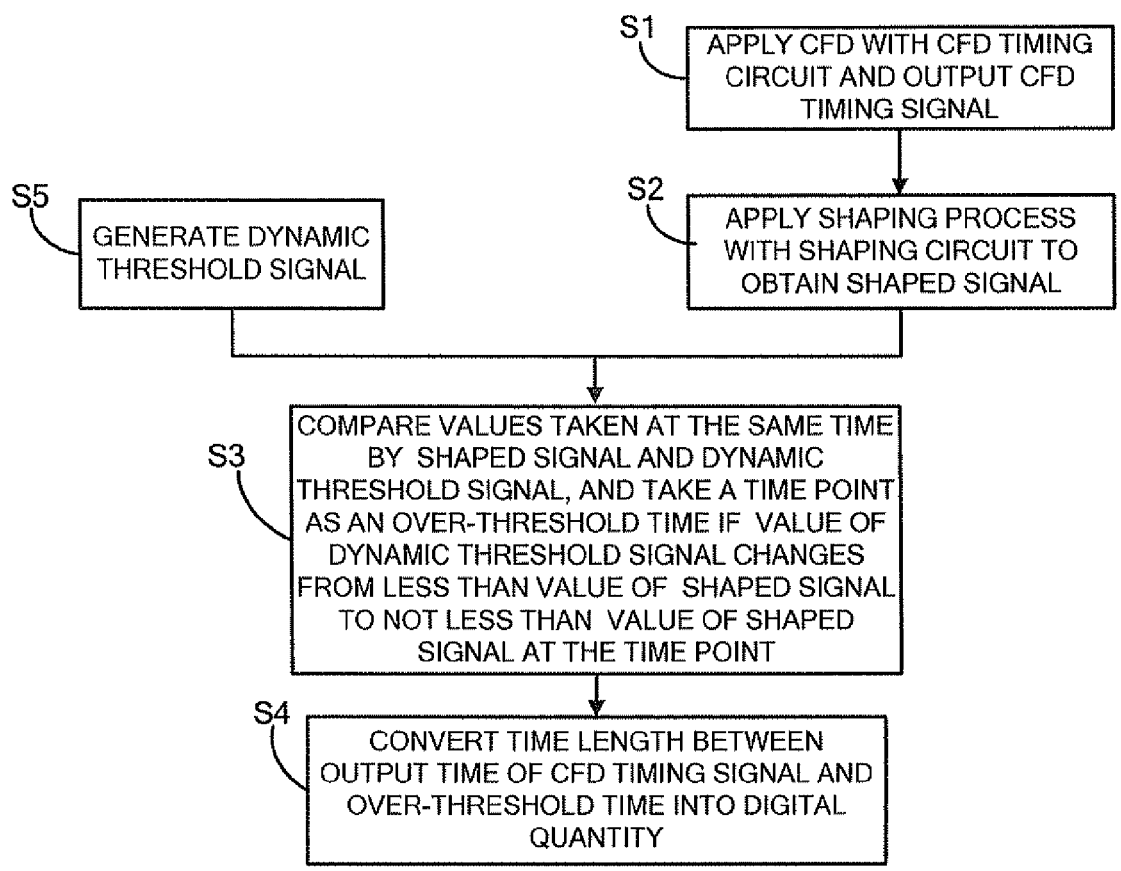
FIG. 8 is a schematic diagram showing a method for amplitude digitization of a nuclear radiation pulse according to another embodiment of the present invention.

As shown in FIG. 8, the method according to embodiments of the present invention may further include a step S5 of generating the dynamic threshold signal, before the step S3 of comparing the values taken at the same time by the shaped signal and the dynamic threshold signal.

According to embodiments of the present invention, the dynamic threshold signal may be generated in two methods, one is to generate based on a pre-stored series of digital threshold voltage values, and the other is generated in real time by using a dynamic threshold generation circuit.

Hereafter, the two methods will be described with reference to embodiments.

I. Generation of Dynamic Threshold Signal Based on a Pre-Stored Series of Digital Threshold Voltage Values The series of digital threshold voltage values may be calculated based on the characteristics of the nuclear event energy detector and the parameters of the shaping circuit.

With this method, the dynamic threshold signal should be generated prior to the time To, and provided to the comparator circuit as input at the time To.

Since values of threshold signals corresponding to shaped signals may be calculated in advance using the above Equation 1, these values may form a sequence of thresholds (i.e., the above series of digital threshold voltage values) for storage.

Figure 9A:
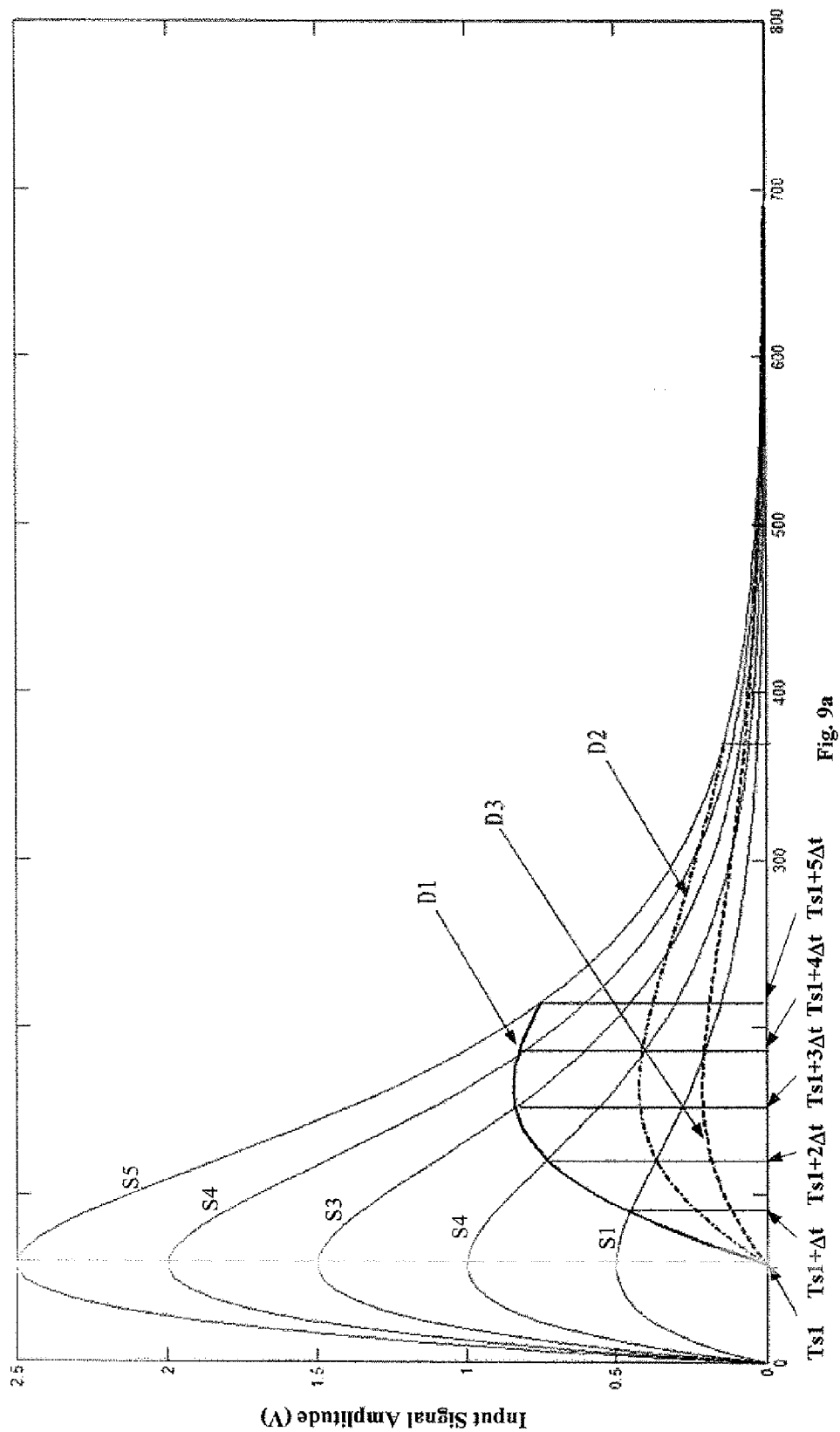
FIG. 9a is a diagram showing a method for generating a digital threshold voltage value according to an embodiment of the present invention.
Figure 9B:
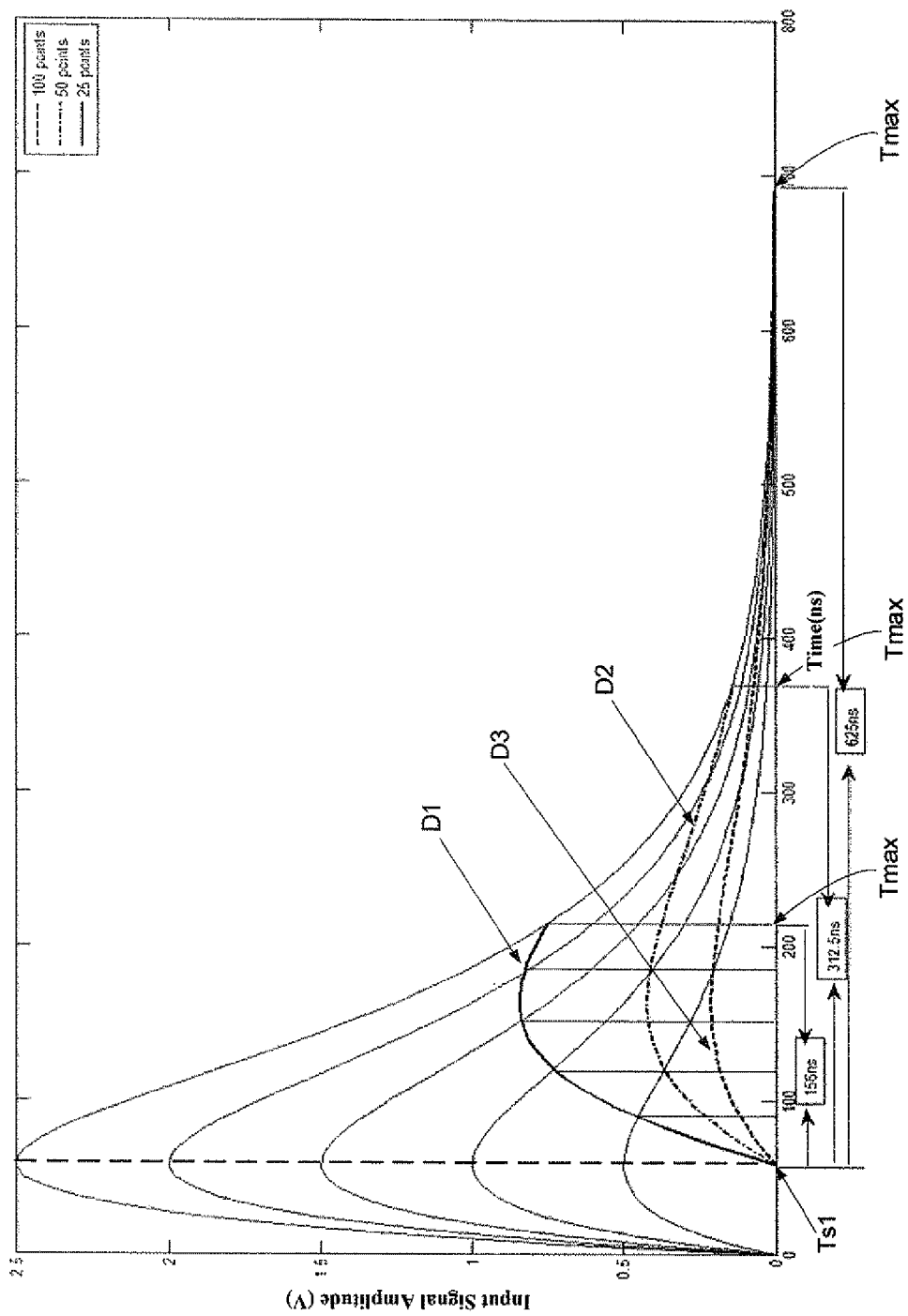
FIG. 9b is a diagram showing another method for generating a digital threshold voltage value according to an embodiment of the present invention.

In the following, two approaches will be introduced for generating the series of digital threshold voltage values. FIG. 9a is a diagram showing one of the approaches for generating the series of digital threshold voltage values, and FIG. 9b is a diagram showing the other approach for generating the series of digital threshold voltage values.

Approach 1:

The flow of generating the series of digital threshold voltage values is shown in FIG. 9a.

1. Determine a time interval $\Delta T$ and the number N of the series of digital threshold voltage values, wherein N is a positive integer not less than 1. In the embodiment of FIG. 9a, N may be 5.

2. Select N shaped signals S1 to SN, such that the signal SN has an amplitude A, the signal S1 has an amplitude A/N, and for the signals S2 to SN−1, amplitudes increase stepwise by A/N.

For example, S1 to S5 may have amplitudes of 0.5V, 1.0V, 1.5V, 2.0V and 2.5V, respectively. As mentioned above, for any given nuclear event energy detector and shaping circuit, the rising time, peaking time and falling time of the shaped signals are fixed. Therefore, it is easy to use a signal generator or software simulation to generate N shaped signals whose shape is the same as that of the subject shaped signal.

3. Set a time for the shaped signal as a time origin To. In this embodiment, the peaking time of the shaped signals is set as the time origin.

4. Store a voltage value corresponding to a time To+M$\Delta T$ for the shaped signal SM as a digital threshold voltage values, wherein M is a positive integer, 1≤M≤N.

In the above way, the series of digital threshold voltage values may be generated. The number of the digital threshold voltage values may be, for example, 5, and these digital threshold voltage values form a discrete digital threshold curve.

To a person skilled in the art, flexible designs may be made with respect to values of the time interval $\Delta T$ and the number N according to precision and other requirements, in order to obtain different dynamic threshold curves, such as curves D1 to D3 in FIG. 9a. To be noted, it is necessary to make sure that the value of To+N$\Delta T$ does not exceed the maximal time length measurable by the TDC circuit.

Approach 2:

The flow of generating the series of digital threshold voltage values is shown in FIG. 9b.

1. Determine a maximal time measure value Tmax. The maximal time measure value Tmax refers to an expected over-threshold time corresponding to a maximal signal amplitude value that can be measured in a system.

2. Set a time of the subject shaped signal as a time origin Ts1. In this embodiment, the peaking time of the subject shaped signal may be set as the time origin.

3. Determine a time interval $\Delta T$.

4. Determine the number N of the series of digital threshold voltage values according to an equation (Tmax−To)/$\Delta T$, wherein N is a positive integer not less than 1.

In this embodiment, N is equal to 5. To a person skilled in the art, flexible designs may be made with respect to values of the time interval $\Delta T$ and the number N according to precision and other requirements.

5. Select N shaped signals S1 to SN, wherein the shaped signal SN has an amplitude A, the shaped signal S1 has an amplitude A/N, and for the shaped signals S2 to SN−1, amplitudes increase stepwise by A/N.

6. Store a voltage value corresponding to a time Ts1+M$\Delta T$ (Ts1+N$\Delta T$=Tmax) for the shaped signal SM as a digital threshold voltage value, wherein M is a positive integer, 1≤M≤N.

In the above way, the series of digital threshold voltage values may be generated, and these digital threshold voltage values form a discrete digital threshold curve.

The $\Delta T$ may be selected to be shorter for a higher measurement precision. In embodiments of the present invention, a 12-bit DAC may be used with a conversion clock of 160 MHz and a clock cycle of 6.25 ns. Taking 156 ns, 312.5 ns and 625 ns as example, there will be 25, 50 and 100 data points (For convenience, FIG. 9b shows just 5 data points), respectively, by dividing 156 ns, 312.5 ns and 625 ns by 6.25 ns. Accordingly, it is necessary to select 25, 50 and 100 shaped signals having different amplitudes.

Figure 9C:
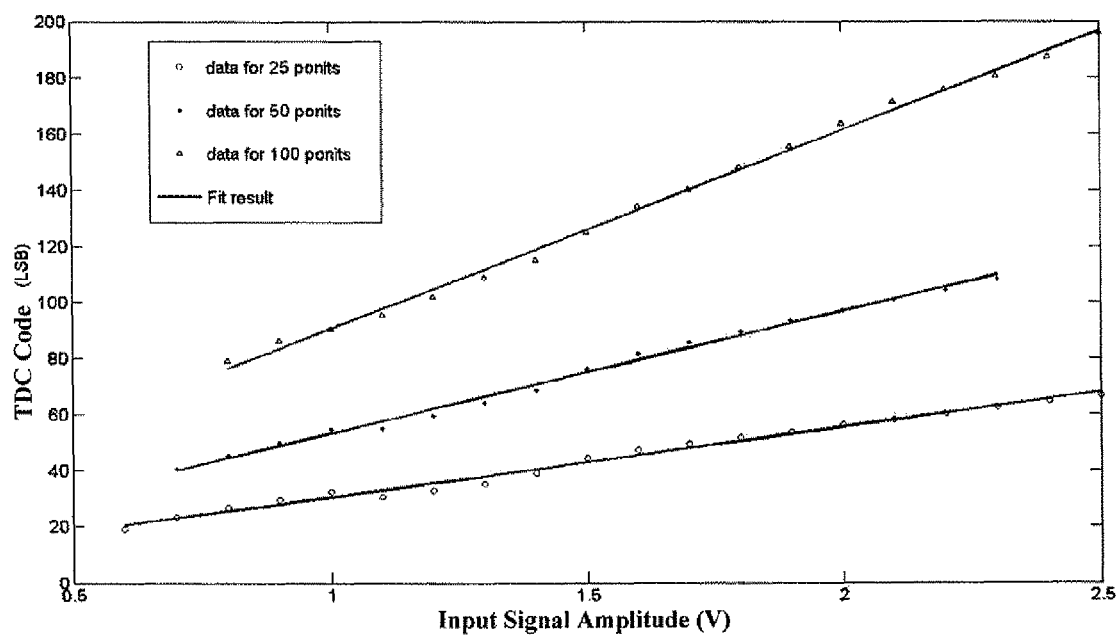
FIG. 9c shows correspondence between over-threshold time widths and amplitudes of output signals from a nuclear event energy detector according to an embodiment of the present invention, the over-threshold time widths are measured based on three dynamic threshold curves D1 to D3 as shown in FIG. 9b.

According to embodiments of the present invention, there is a good linear relationship between over-threshold time width and amplitude values of signals output from the shaping circuit. An arbitrary waveform signal generator may be used to generate signal waveform the same as that of the signal waveform output from the nuclear event energy detector. The amplitude of the waveform may be controlled to obtain different measurement values. FIG. 9c shows correspondence between over-threshold time width and amplitudes of output signals from the nuclear event energy detector according to an embodiment of the present invention, the over-threshold time width are measured based on three dynamic threshold curves D1 to D3 as shown in FIG. 9b. As shown, there is a good linear relationship between over-threshold time width and amplitude values of signals output from the shaping circuit according to embodiments of the present invention.

Figure 10:
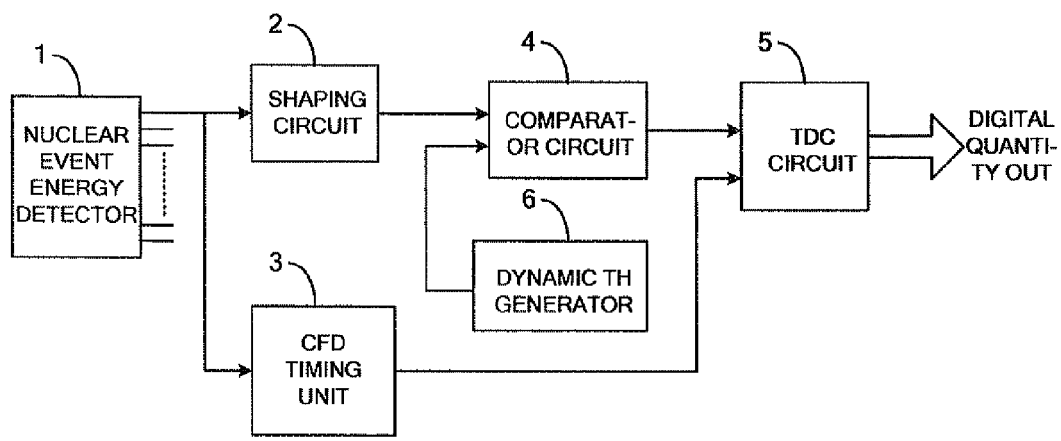
FIG. 10 is a further schematic block diagram of a system for amplitude digitization of a nuclear radiation pulse according to an embodiment of the present invention.
Figure 11:
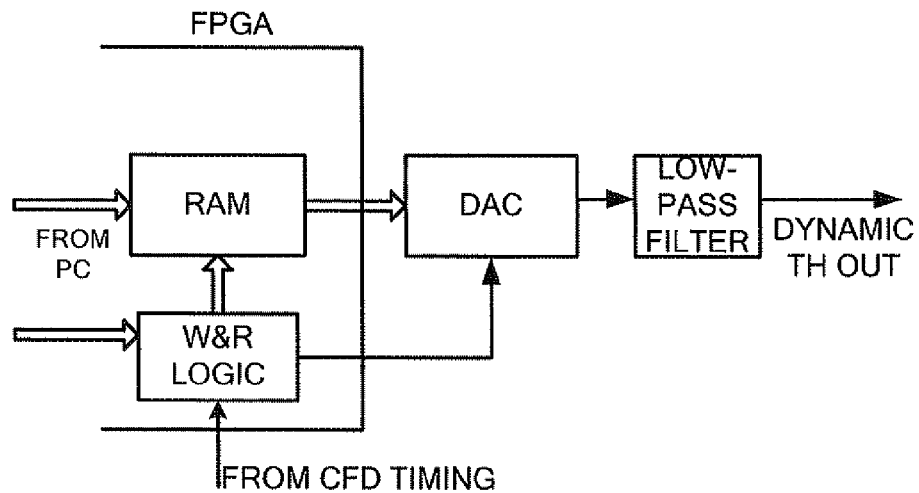
FIG. 11 is a schematic block diagram of a dynamic threshold voltage generation unit based on FPGA chip according to an embodiment of the present invention.

With reference to FIG. 10, the above system further includes a dynamic threshold generation circuit 6 connected to the comparator circuit 4 and configured for generating the dynamic threshold signal. FIG. 11 is a schematic block diagram of a dynamic threshold voltage generation circuit 6 based on a FPGA (Field Programmable Gate Array) chip according to an embodiment of the present invention, where the dynamic threshold voltage generation circuit 6 generate dynamic threshold signals from the pre-stored series of digital threshold voltage values. As shown in FIG. 11, the dynamic threshold voltage generation circuit 6 may include a static memory (RAM), a digital-to-analog conversion circuit (DAC) and a low-pass filter. The static memory may store the series of digital threshold voltage values in advance, and may be connected to a write & read logic module. The write & read logic module may receive timing signals from the CFD timing circuit for controlling write and read of the static memory.

The DAC may be connected to the static memory to receive the series of digital threshold voltage values read from the static memory, convert the series of digital threshold voltage values into an analog signal and output the analog signal to the low-pass filter. The low-pass filter may be connected to the DAC, filter the analog signal and generate a dynamic threshold voltage signal.

In the embodiment of FIG. 11, the series of digital threshold voltage values may be calculated by a PC and stored in the static memory of the FPGA in advance. The write & read logic module may read out the series of digital threshold voltage values one by one at a preset time interval (e.g., 6.25 ns). The series of digital threshold voltage values may be subjected to processing of the DAC and the low-pass filter to generate a dynamic threshold voltage signal which is continuous in time and amplitude. To improve the accuracy of the threshold voltage signal, DAC chips having higher resolution and higher conversion clock rate may be used.

II. Generation of Dynamic Threshold Signal in Real Time by a Dynamic Threshold Generation Circuit According to the type and parameters of a nuclear event energy detector, and particles to be detected, it is possible to utilize a hardware circuit to emulate the signal readout process of the detector to generate a voltage or current signal which has the same shape as that of the subject signal output from the nuclear event energy detector. The generated signal may undergo a shaping process by a shaping circuit identical to that for the output signal to be measured from the nuclear event energy detector. Then, the shaped signal may be multiplied, at its peaking time, with a linear ramp voltage signal generated by another circuit. The resultant signal may be buffered and amplified by an amplification circuit to become a continuous dynamic threshold signal. The principle of the method will be detained with reference to an embodiment of the present invention in the following.

The embodiment relates to digitization of a γ ray energy signal of 511 KeV. The nuclear event energy detector is a scintillation detector based on LYSO crystal. The current signal output from the nuclear event energy detector is a signal with exponential attenuation (see FIG. 1), and the attenuation time constant is equal to the decay time constant of the LYSO crystal. An analytic expression for a waveform obtained by passing the signal through the active RC integration circuit (see FIG. 6) is:

$$V = C_1(e^{-t/\tau_1} - e^{-t/\tau_2}) \quad \text{(Equation 2)}$$

where $\tau_1$ represents the decay time constant of the LYSO crystal, $\tau_2$ represents the time constant of the integration circuit (see FIG. 6), $C_1$ is a constant determined by ray energy, $\tau_1$ and $\tau_2$, and $\tau$ represents time. The peaking time of the pulse is represented as:

$$t_p = \frac{\tau_1 \tau_2}{\tau_2 - \tau_1} \ln \frac{\tau_2}{\tau_1}$$

At a time t after the peaking time (i.e., in the following equation, t denotes a time with respect to the peaking time as the time origin), the signal waveform may be shown in Equation 3

$$V' = C_1(C_2 e^{-t/\tau_1} - C_3 e^{-t/\tau_2}) \quad \text{(Equation 3)}$$

where, $C_2 = e^{-t_p/\tau_1}$, $C_3 = e^{-t_p/\tau_2}$,

The peak amplitude of the signal is $V_p = C_1(C_2 - C_3)$,

If the dynamic threshold function varies in accordance with Equation 4 from the peaking time point (i.e. To in the embodiment), $$V_{th} = A \times t \times (C_2 e^{-t/\tau_1} - C_3 e^{-t/\tau_2}) \quad \text{(Equation 4)}$$

where A is a constant, the over-threshold time width (Tot–To)=t is proportional to $V_p$:

$$t = \frac{V_p}{A(C_2 - C_3)} \quad \text{(Equation 5)}$$

Different dynamic threshold curves may be obtained by selecting different constants A. Generation of dynamic threshold may involve how to obtain a signal output of Equation 4 using an analog circuit. This is substantially a multiplication of two signals: a linear ramp voltage signal and a dual-exponential signal in the bracket. From comparison of Equations 3 and 4, it can be seen that the signal is a part of a signal output from the detector after the peaking time point. The two signals differ in amplitude by a factor. The constant A in Equation 4 may be determined based on a gain of the amplification circuit at the last stage of the dynamic threshold generation circuit. By selecting different gains, it is possible to obtain dynamic threshold curves having different rising slopes.

Figure 9D:
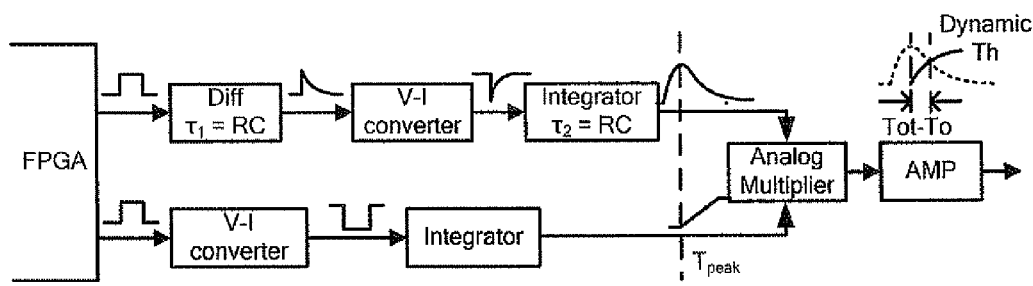
FIG. 9d is a schematic circuit diagram showing the principle for a dynamic threshold generation circuit to generate a dynamic threshold according to an embodiment of the present invention.

FIG. 9d is a schematic circuit diagram showing the principle for a dynamic threshold generation circuit to generate a dynamic threshold according to an embodiment of the present invention. As shown in FIG. 9d, the dynamic threshold generation circuit may include two sections. The first section of the circuit is configured to generate a shaped signal having the same shape as that of the subject shaped signal, and the second section of the circuit is configured to generate a linear ramp voltage signal.

The dynamic threshold generation circuit may further include an analog multiplier and an amplification circuit. The analog multiplier is configured to multiply the shaped signal with the linear ramp voltage signal, and the amplification circuit is configured to amplify the resultant signal of the multiplication to obtain a desired dynamic threshold signal. As described above, the shaped signal may be multiplied, from its peaking time point, with the linear ramp voltage signal. Further, when the shaped signal reaches its peak, the linear ramp voltage signal is zero.

The first section may include a differentiation circuit, a voltage-to-current conversion circuit and an integration circuit connected in this order, and the second section may include a voltage-to-current conversion circuit and an integration circuit connected in this order. Each of the first and second sections may receive a square wave voltage signal as input. The square wave voltage signal may be from a FPGA, for example.

Figure 9E:
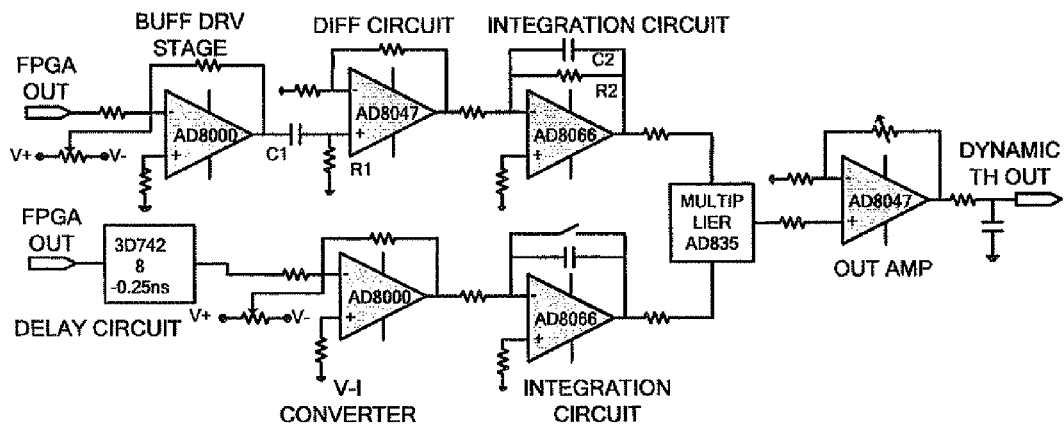
FIG. 9e is a specific circuit diagram of the schematic circuit diagram shown in FIG. 9d.

FIG. 9e is a specific schematic circuit diagram according to the principle shown in FIG. 9d. The upper part of FIG. 9e corresponds to the first section of FIG. 9d. The square wave voltage signal output from the FPGA may be passed through the differentiation circuit to generate a voltage signal having the same shape as that of the current signal output from the nuclear event energy detector (in this embodiment, LYSO scintillation crystal). This may be carried out by controlling the differentiation time constant of the differentiation circuit to be equal to the decay time of the LYSO. The two signals may be the same in shape but different in amplitude. The voltage signal may be converted by the voltage-to-current conversion circuit into a current signal having the same shape as that of the current signal output from the detector. Then, the converted current signal may be input to a shaping circuit which is identical to the shaping circuit for the subject shaped signal to generate a shaped signal having the same shape as that of the subject shaped signal. In this embodiment, the shaping circuit is an integration circuit as described above.

The lower part of FIG. 9e corresponds to the second section of FIG. 9d. The square wave voltage signal output from the FPGA may be converted into a current signal by the voltage-to-current conversion circuit. Then, the current signal is input to the integration circuit of the second section to generate the linear ramp voltage signal.

The two signals may be multiplied with each other in an analog multiplier circuit, and then passed through an amplification circuit to output an expected dynamic threshold signal.

In FIG. 9e, before generation of the linear ramp voltage signal, an analog signal delay circuit may be provided to align the two signals for multiplication.

Figure 9F:
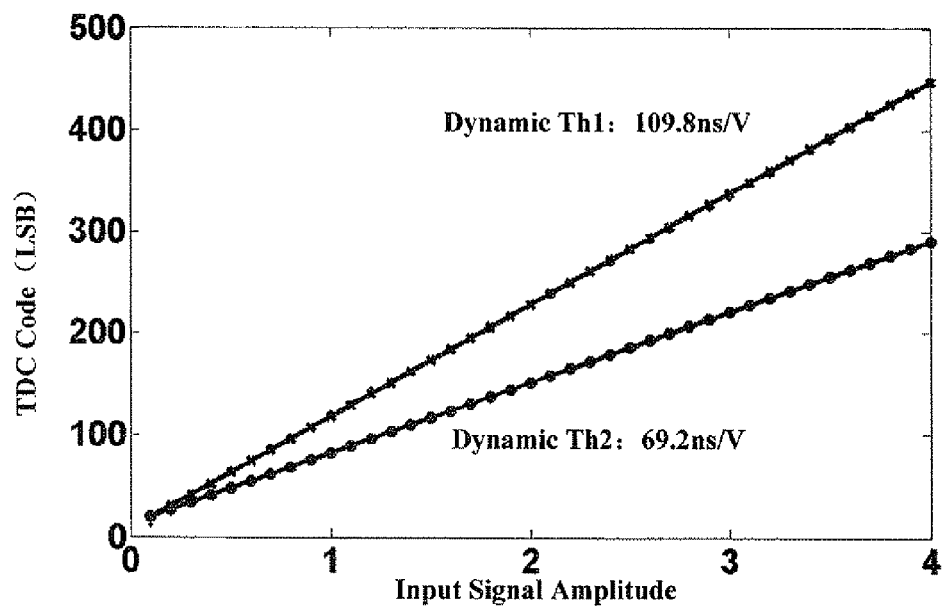
FIG. 9f shows correspondence between over-threshold time widths and amplitudes of output signals from a nuclear event energy detector, the over-threshold time widths are measured based on two dynamic threshold curves generated by using the circuit of FIG. 9e to control a gain of an amplification circuit at the last stage.

Again, an arbitrary waveform signal generator may be used to generate a signal having the same waveform as that of the signal output from the nuclear event energy detector, and it is possible to obtain different measurement values by controlling the amplitude of the waveform. FIG. 9f shows the correspondence between over-threshold time width and amplitudes of output signals from the nuclear event energy detector based on two dynamic threshold curves. By controlling the gain of the amplification stage in the circuit of FIG. 9e, dynamic threshold curves with different ramp rate could be obtained. It can be seen from the figures that with the generation of dynamic threshold signal in real time by a dynamic threshold generation circuit according to the embodiment of the present invention, there is a good linear relationship between over-threshold time width and amplitudes of the subject shaped signal output from the shaping circuit.

Figure 12:
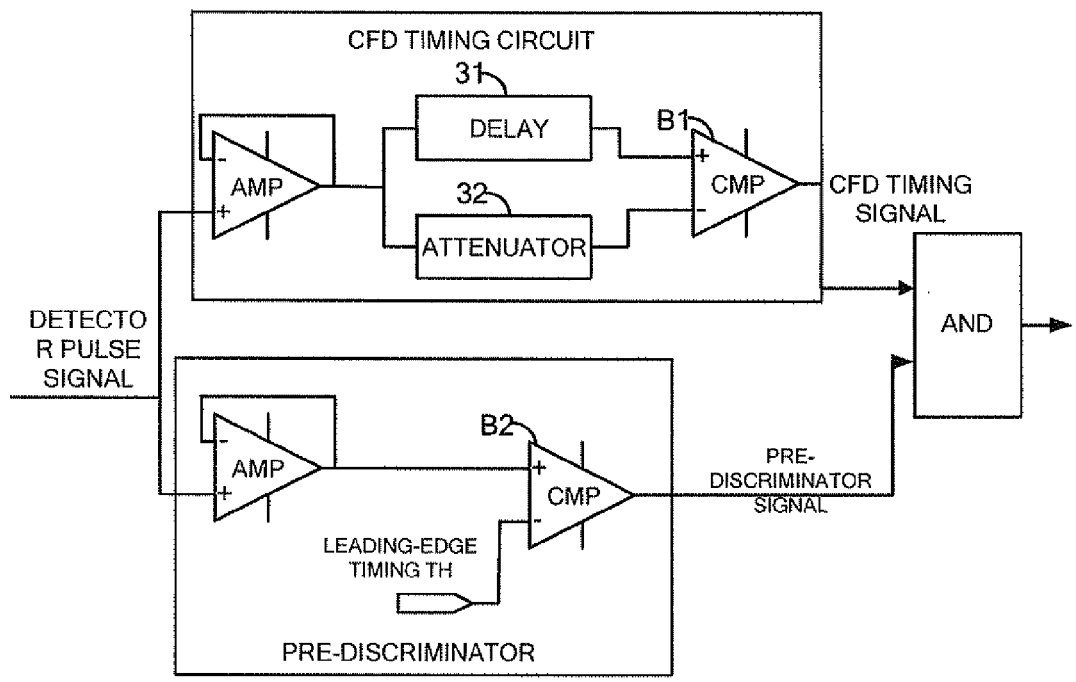
FIG. 12 is a block diagram of a CFD timing circuit according to an embodiment of the present invention.

In an embodiment as shown in FIG. 12, a pre-discrimination circuit may be used to cooperate with the CFD timing circuit to generate a CFD timing output for an effective event. The pre-discrimination circuit is a simple leading-edge timing circuit which compares an input signal with a fixed leading-edge timing threshold (i.e., a DC voltage), and outputs a pre-discrimination signal only when the value of the input signal exceeds the leading-edge timing threshold. The pre-discrimination circuit is provided here in order to avoid any output of the CFD timing signal resulting from noise. The leading-edge timing threshold of the pre-discrimination circuit may be given by an output from a DAC chip. To be noted, the output of the pre-discrimination signal should be prior to the output of the CFD timing signal. In FIG. 12, the output of the CFD timing circuit can be outputted via an AND gate only when the output of the pre-discrimination circuit is enabled.

Figure 13:
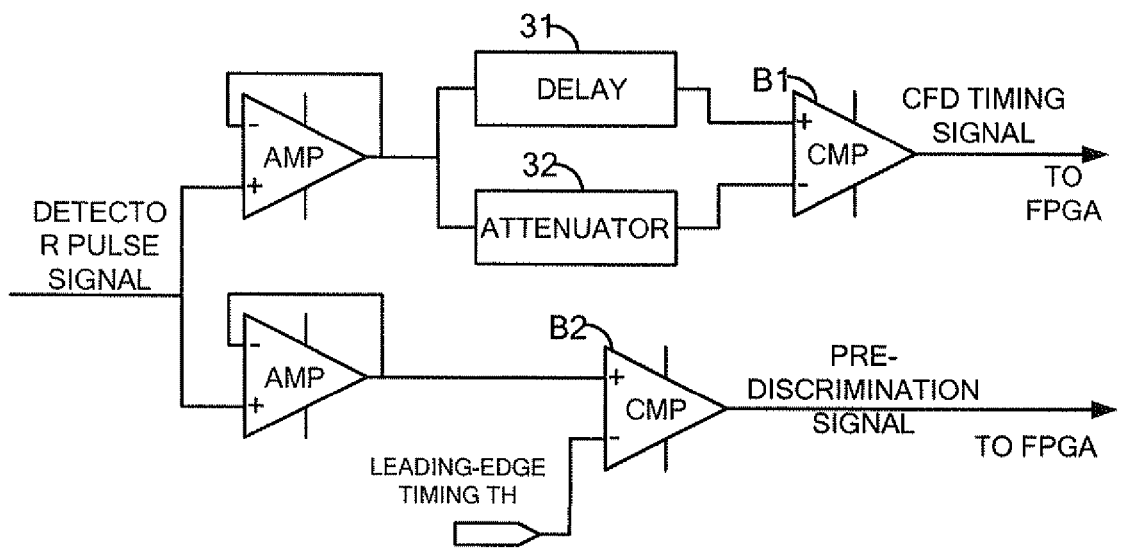
FIG. 13 is another block diagram of a CFD timing circuit according to an embodiment of the present invention.

In an embodiment of the present invention, the outputs of both the CFD timing circuit and the pre-discrimination circuit are connected to the input terminal of the FPGA chip (see FIG. 13). Inside the FPGA, a logic judgment (similar to the above AND gate) may be provided to judge, only upon receiving a pre-discrimination signal, that the output of the CFD timing circuit indicates an effective nuclear event, and the arrival time of the CFD timing signal is to be recorded. Here, the TDC unit 5 may further include an instructing unit which may instruct the TDC circuit to operate when the instructing unit receives the pre-discrimination signal.

Figure 14:
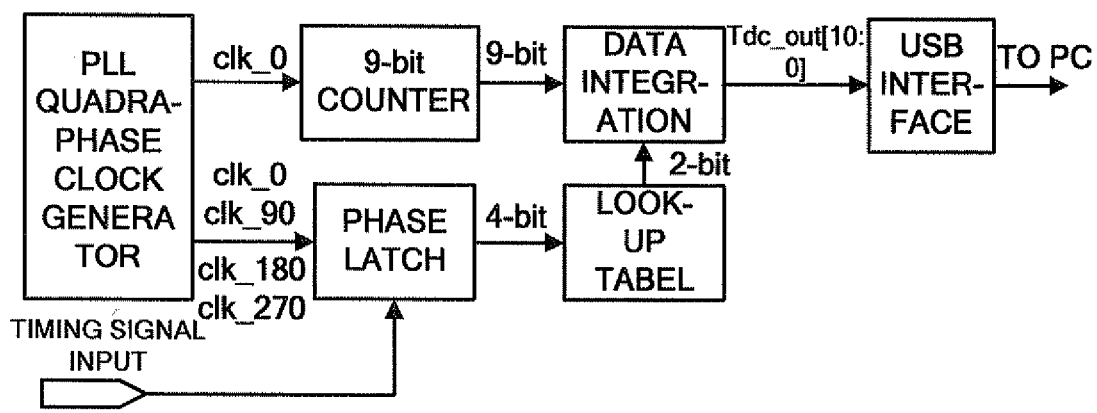
FIG. 14 is a schematic timing diagram according to an embodiment of the present invention.

Currently, the basic principle of the conventional time measurement technology is using a counter to count the number of clocks from a start time point to an end time point (in embodiments of the present invention, the start time may be the arrival time Td of the CFD timing signal, and the end time point may be the over-threshold time Tot). A method for improving measurement precision is to increase clock frequency. To further improve the measurement precision in the case of implementing the function of the TDC circuit with FPGA, a quad-phase clock may be used to reduce measurement uncertainty to one fourth of a clock cycle. In FIG. 14, at the arrival time of the CFD timing signal (in FIG. 14, a timing signal input represents the CFD timing signal and the pulse signal output from the comparator circuit described below), a count value of a 9-bit counter together with the state of the quad-phase clock (i.e., recording the arrival time of a event) is latched and recorded as the count value and phase at the start time. When the pulse signal output from the comparator circuit arrives, the count value of the counter and the state of the quad-phase clock are recorded again (i.e., recording over-threshold time Tot of the event). Based on the counter values and the states of the quad-phase clock at the two time points, a computer may subtract $\Delta T$ from the measured time width to implement the amplitude digitization. By taking a clock of 160 MHz as example, the time measurement precision using of a quad-phase clock may be one fourth of the cycle of the 160 MHz clock, that is, 1.5625 ns.

In implementing the present invention, factors influencing the overall measurement precision may include CFD timing precision, TDC measurement precision, precision of the dynamic threshold generation circuit. The measurement precision may also depend on correspondence between the range of TDC measurement and the range of the subject signal amplitude. By taking into account these factors and the characteristics of the nuclear event energy detector, it is possible to achieve a high-precision digitization of nuclear radiation pulse amplitude.

According to the present invention, the voltage amplitude value of a nuclear radiation pulse signal can be converted into an over-threshold time quantity by using time digital conversion technology, thereby achieving digitization of energy signals without significantly increasing the front-end readout circuit of the nuclear event energy detector.

Some embodiments of the present invention may utilize FPGA chip or semiconductor integrated circuit technology. Using such technology may be advantageous in that it is possible to realize parallel readout of a large number of channels, and thus achieve a highly integrated multi-channel measurement of nuclear event energy signals. Accordingly, embodiments of the present invention are particularly applicable to nuclear imagining detectors (which requires simultaneous readout of nuclear event energy information detected by tens, hundreds or even thousands of channels), and meets requirements from experimental researches and practical applications of nuclear imagining detectors.

The embodiments of the present invention are described in a progressive manner in the specification, and each embodiment focuses on differences from other embodiments. The same or similar part of the embodiments may be inter-referred. Apparatuses disclosed in the embodiments may correspond to methods disclosed in the embodiments, and thus description of apparatuses is brief. For relevant details, the description of methods may be referred to.

The above description of the embodiments is intended to enable a person skilled in the art to implement or apply the present invention. Various modifications of the embodiments may be apparent to a person skilled in the art, and the general principle defined in the specification may be implemented in other embodiments without departing from the spirit or scope of the present invention. Accordingly, the present invention is not limited to the disclosed embodiments, but has a broadest scope conformable to the principle and novel features disclosed in the specification.

What is claimed is:

1. A method for amplitude digitization of a nuclear pulse, comprising steps of:
   applying, by a constant fraction discrimination (CFD) timing circuit, a CFD timing process on a subject pulse signal output from a nuclear event energy detector, and outputting a CFD timing signal for indicating an arrival time Td of a present nuclear event;
   applying, by a shaping circuit, a shaping process on the subject pulse signal to obtain a subject shaped signal;
   comparing, from a time To, values taken at the same time by the subject shaped signal and a dynamic threshold signal, and taking, as an over-threshold time Tot for the present nuclear event, a time when the value of the dynamic threshold signal changes from less than the value of the subject shaped signal to not less than the value of the subject shaped signal, wherein a time length between Td and To is preset as $\Delta T$;
   converting a time length between Td and Tot into a digital quantity;
   wherein the dynamic threshold signal satisfies an equation $$\frac{Tot2 - To}{Vot2} = \frac{Tot1 - To}{Vot1},$$

Tot1 represents an over-threshold time for a first shaped signal compared with the dynamic threshold signal, Vot1 represents an amplitude of the first shaped signal, Tot2 represents an over-threshold time for a second shaped signal compared with the dynamic threshold signal, Vot2 represents an amplitude of the second shaped signal.

2. The method of claim 1, further comprising generating the dynamic threshold signal before comparing the values taken at the same time by the subject shaped signal and the dynamic threshold signal.

3. The method of claim 2, wherein said generating the dynamic threshold signal further comprises:
   generating the dynamic threshold signal based on a pre-stored series of digital threshold voltage values.

4. The method of claim 3, further comprising, before said generating the dynamic threshold signal based on a pre-stored series of digital threshold voltage values:
   determining a time interval $\Delta t$ and the number N of the series of digital threshold voltage values, wherein N is a positive integer not less than 1;
   selecting N shaped signals S1 to SN, wherein the signal SN has an amplitude A, the signal S1 has an amplitude A/N, and for the signals S2 to SN−1, amplitudes increase stepwise by A/N;
   setting a time for the shaped signal as a time origin Ts1;
   storing a voltage value corresponding to a time Ts1+M$\Delta t$ for the shaped signal SM as a digital threshold voltage value, wherein 1≤M≤N.

5. The method of claim 4, wherein said generating the dynamic threshold signal based on a pre-stored series of digital threshold voltage values comprises:
   reading out the pre-stored series of digital threshold voltage values sequentially at the preset time interval, and digital-to-analog converting the readout digital threshold voltage values into analog signals;
   low-pass filtering and amplifying the analog signals to obtain the dynamic threshold signal.

6. The method of any one of claims 1 to 5, wherein said converting the time length between Td and Tot into a digital quantity comprises:
   converting the time length between Td and Tot into a digital quantity when the subject pulse signal outputted from the nuclear event energy detector has a value not less than a fixed threshold.

7. The method of any one of claims 1 to 5, wherein the shaping process comprises an active integration shaping process.

8. A system for amplitude digitization of a nuclear pulse, wherein the system comprises a nuclear energy detector, a shaping circuit, a constant fraction discrimination (CFD) timing unit, a comparator circuit and a time digital conversion (TDC) unit; the nuclear event energy detector has an output terminal connected to input terminals of the shaping circuit and the CFD timing unit, the CFD timing unit comprises a CFD timing circuit, and the TDC unit comprises a TDC circuit;
   wherein:
   the shaping circuit is configured to apply a shaping process on a subject pulse signal output from the nuclear event energy detector and output a subject shaped signal;
   the CFD timing circuit is configured to apply a CFD process on the subject pulse signal output from the nuclear event energy detector, and output a CFD timing signal for indicating an arrival time Td of a present nuclear event;
   the comparator circuit is configured to compare, from a time To, values taken at the same time by the subject shaped signal and a dynamic threshold signal, and when the value of the dynamic threshold signal changes from less than the value of the subject shaped signal to not less than the value of the subject shaped signal, to output a pulse signal for indicating an over-threshold time Tot for the present nuclear event, wherein a time length between Td and To is preset;
   the TDC circuit is configured to record the Td and Tot, and convert a time length between Td and Tot into a digital quantity;
   wherein the dynamic threshold signal satisfies an equation $$\frac{Tot2 - To}{Vot2} = \frac{Tot1 - To}{Vot1},$$

Tot1 represents an over-threshold time for a first shaped signal compared with the dynamic threshold signal, Vot1 represents an amplitude of the first shaped signal, Tot2 represents an over-threshold time for a second shaped signal compared with the dynamic threshold signal, Vot2 represents an amplitude of the second shaped signal.

9. The system of claim 8, further comprising a dynamic threshold generation unit configured to generate the dynamic threshold signal.

10. The system of claim 8, wherein the CFD timing unit further comprises a pre-discrimination circuit, and the TDC unit further comprises an instructing unit,
    the pre-discrimination circuit is configured to output a pre-discrimination signal when the subject pulse signal output from the nuclear event energy detector has a value higher than a fixed leading edge timing threshold; and
    the instructing unit is configured to instruct the TDC circuit to operate upon receiving the pre-discrimination signal.

11. A method for amplitude digitization of a nuclear radiation pulse by converting the amplitude of the nuclear radiation pulse linearly into a time length and measuring the time length, said method comprises steps of:

generating, based on a subject current signal output from a nuclear event energy detector, a constant fraction discrimination (CFD) timing signal for indicating an arrival time Td of the subject current signal;

applying a shaping process on the subject current signal to obtain a subject shaped signal;

comparing, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as ΔT;

converting a time length between the time Td and the time Tot into a digital quantity as a digitized value of the amplitude of the nuclear radiation pulse;

wherein for any two subject shaped signals having amplitudes Vot1 and Vot2, respectively, the dynamic threshold signal satisfies an equation $$\frac{Tot2 - To}{Vot2} = \frac{Tot1 - To}{Vot1},$$

Tot1 represents an over-threshold time for one of the subject shaped signals compared with the dynamic threshold signal, and Tot2 represents an over-threshold time for the other of the subject shaped signals compared with the dynamic threshold signal.

12. The method for amplitude digitization of a nuclear radiation pulse of claim 11, wherein said generating the CFD timing signal comprises:
applying a CFD process on the subject current signal to obtain the CFD timing signal; or
applying a CFD process on a timing current signal output from the nuclear event energy detector to obtain the CFD timing signal; or
applying a shaping process on the subject current signal to generate a shaped signal, and then applying a CFD process on the shaped signal to obtain the CFD timing signal.

13. The method for amplitude digitization of a nuclear radiation pulse of claim 11, wherein the time To comprises a time when a peak of the subject shaped signal arrives.

14. The method for amplitude digitization of a nuclear radiation pulse of claim 11, wherein the subject shaped signal comprises a voltage signal obtained by integrating the subject current signal.

15. The method for amplitude digitization of a nuclear radiation pulse of claim 11, further comprising generating the dynamic threshold signal before comparing the subject shaped signal and the dynamic threshold signal.

16. The method for amplitude digitization of a nuclear radiation pulse of claim 15, wherein said generating the dynamic threshold signal further comprises:
generating the dynamic threshold signal based on a prestored series of digital threshold voltage values.

17. The method for amplitude digitization of a nuclear radiation pulse of claim 16, wherein said generating the dynamic threshold signal based on a pre-stored series of digital threshold voltage values further comprises:
digital-to-analog converting and low-pass filtering the series of digital threshold voltage values.

18. The method for amplitude digitization of a nuclear radiation pulse of claim 16, wherein the series of digital threshold voltage values is calculated based on characteristics of the nuclear event energy detector and parameters of the shaping circuit.

19. The method for amplitude digitization of a nuclear radiation pulse of claim 18, wherein said generating the series of digital threshold voltage values comprises:
1) determining a time interval ΔT and the number N of the series of digital threshold voltage values, wherein N is a positive integer not less than 1;
2) selecting N shaped signals S1 to SN such that the shaped signal SN has an amplitude A, the shaped signal S1 has an amplitude A/N, and for the shaped signals S2 to SN−1, amplitudes increase stepwise by A/N, wherein the N shaped signals have the same shape as that of the subject shaped signal;
3) setting the time To;
4) storing a voltage value corresponding to a time To+MΔT for the shaped signal SM as a digital threshold voltage value, wherein M is a positive integer, 1≤M≤N.

20. The method for amplitude digitization of a nuclear radiation pulse of claim 18, wherein said generating the series of digital threshold voltage values comprises:
1) determining a maximal time measure value Tmax, wherein the Tmax is an expected over-threshold time corresponding to a maximal signal amplitude value that can be measured in a system;
2) setting the time To;
3) determining a time interval ΔT;
4) determining the number N of the series of digital threshold voltage values according to an equation (Tmax−To)/ΔT, wherein N is a positive integer not less than 1;
5) selecting N shaped signals S1 to SN, wherein the shaped signal SN has an amplitude A, the shaped signal S1 has an amplitude A/N, and for the shaped signals S2 to SN−1, amplitudes increase stepwise by A/N, wherein the N shaped signals have the same shape as that of the subject shaped signal;
6) storing a voltage value corresponding to a time To+MΔT for the shaped signal SM as a digital threshold voltage value, wherein M is a positive integer, 1≤M≤N.

21. The method for amplitude digitization of a nuclear radiation pulse of claim 15, wherein said generating the dynamic threshold signal comprises:
generating, by a dynamic threshold generation circuit, the dynamic threshold signal in real time.

22. The method for amplitude digitization of a nuclear radiation pulse of claim 21, wherein said generating the dynamic threshold signal comprises:
multiplying a linear ramp voltage signal with a shaped signal having the same shape as that of the subject shaped signal.

23. The method for amplitude digitization of a nuclear radiation pulse of claim 22, wherein the shaped signal is multiplied with the linear ramp voltage signal from a time when the shape signal arrives at its peak.

24. The method for amplitude digitization of a nuclear radiation pulse of claim 23, wherein the linear ramp voltage signal has a value of zero when the shaped signal arrives at its peak.

25. The method for amplitude digitization of a nuclear radiation pulse of claim 24, wherein the shaped signal multiplied with the linear ramp voltage signal is generated by generating, by an analog circuit, a current signal having the same shape as that of the subject current signal, and applying, by another shaping circuit resembling the shaping circuit, a shaping process on the generated current signal.

26. The method for amplitude digitization of a nuclear radiation pulse of claim 25, wherein the dynamic threshold signal is obtained by amplifying and buffering a signal generated from the multiplication of the linear ramp voltage signal and the shaped signal.

27. The method for amplitude digitization of a nuclear radiation pulse of claim 26, further comprising: generating dynamic threshold signals with different ramping rates by changing an amplifying gain.

28. A system for amplitude digitization of a nuclear radiation pulse, wherein the system comprises a nuclear event energy detector, a shaping circuit, a constant fraction discrimination (CFD) timing unit, a comparator circuit and a time digital conversion (TDC) unit; the nuclear event energy detector has an output terminal connected to input terminals of the shaping circuit and the CFD timing unit, the CFD timing unit comprises a CFD circuit, and the TDC unit comprises a TDC circuit;

wherein:
the shaping circuit is configured to apply a shaping process on a subject current signal output from the nuclear event energy detector, and output a subject shaped signal;
the CFD timing circuit is configured to applying a CFD process on the subject current signal output from a nuclear event energy detector, and output a CFD timing signal for indicating an arrival time Td of the subject current signal;
the comparator circuit is configured to compare, from a time To, values taken at the same time by the subject shaped signal and a dynamic threshold signal, and taking a time Tot as an over-threshold time if the value of the dynamic threshold signal changes from less than the value of the subject shaped signal to not less than the value of the subject shaped signal at the time Tot, wherein a time length between the time To and the arrival time Td of the subject current signal is preset as ΔT;
the TDC circuit is configured to record the times Td and Tot, and convert a time length between the time Td and the time Tot into a digital quantity;
wherein for any two subject shaped signals having amplitudes Vot1 and Vot2, respectively, the dynamic threshold signal satisfies an equation $$\frac{Tot2 - To}{Vot2} = \frac{Tot1 - To}{Vot1},$$

Tot1 represents an over-threshold time for one of the subject shaped signals compared with the dynamic threshold signal, and Tot2 represents an over-threshold time for the other of the subject shaped signals compared with the dynamic threshold signal.

29. The system for amplitude digitization of a nuclear radiation pulse of claim 28, wherein the CFD timing unit further comprises a pre-discrimination circuit configured to output a pre-discrimination signal when the subject current signal has a value higher than a leading edge timing threshold.

30. The system for amplitude digitization of a nuclear radiation pulse of claim 29, wherein the TDC unit further comprises an instructing unit configured to instruct the TDC circuit to operation upon receiving the pre-discrimination signal.

31. The system for amplitude digitization of a nuclear radiation pulse of claim 28, further comprising a dynamic threshold generation circuit configured to generate the dynamic threshold signal.

32. The system for amplitude digitization of a nuclear radiation pulse of claim 31, wherein the dynamic threshold generation circuit comprises a memory, a digital-to-analog conversion circuit and a low-pass filter,
the memory is configured to store a series of digital threshold voltage values calculated in advance;
the digital-to-analog conversion circuit is connected to the memory and configured to read out a series of digital threshold voltage values from the memory, convert the readout series of digital threshold voltage values into an analog signal and output the analog signal to the low-pass filter; and
the low-pass filter is connected to the digital-to-analog conversion circuit and configured to low-pass filtering the analog signal to generate a dynamic threshold voltage signal.

33. The system for amplitude digitization of a nuclear radiation pulse of claim 32, wherein the memory comprises a static memory connected to a write & read logic module which is configured to control writing and reading of the static memory.

34. The system for amplitude digitization of a nuclear radiation pulse of claim 31, wherein the dynamic threshold generation circuit comprises a first section, a second section, an analog multiplier and an amplification circuit,
the first section is configured to generate a shaped signal having the same shape as that of the subject shaped signal, the second section is configured to generate a linear ramp voltage signal;
the analog multiplier is configured to multiply the shaped signal with the linear ramp voltage signal, and the amplification circuit is configured to amplify a signal resulting from the multiplication to obtain a desired dynamic threshold signal.

35. The system for amplitude digitization of a nuclear radiation pulse of claim 34, wherein the first section comprises a differentiation circuit, a voltage-to-current conversion circuit and a shaping circuit connected in this order, and receives a square wave voltage signal as input.

36. The system for amplitude digitization of a nuclear radiation pulse of claim 35, wherein the differentiation circuit of the first section is configured to differentiate the square wave voltage signal to produce a voltage signal having the same shape as that of the subject current signal output from the nuclear event energy detector.

37. The system for amplitude digitization of a nuclear radiation pulse of claim 36, wherein the voltage-to-current conversion circuit of the first section is configured to convert the voltage signal generated by the differentiation circuit into a current signal having the same shape as that of the subject current signal output from the nuclear event energy detector.

38. The system for amplitude digitization of a nuclear radiation pulse of claim 37, wherein the shaping circuit of the first section is the same as the shaping circuit for generating the subject shaped signal.

39. The system for amplitude digitization of a nuclear radiation pulse of claim 34, wherein the second section comprises a voltage-to-current conversion circuit and an integration circuit connected in this order.

* * * * *